US008516862B2

(12) United States Patent
Stuckey

(10) Patent No.: US 8,516,862 B2
(45) Date of Patent: Aug. 27, 2013

(54) LOCKING ARRANGEMENT

(75) Inventor: David Martin Stuckey, Eaglemont (AU)

(73) Assignee: David Martin Stuckey Investments Pty Ltd (AU)

(*) Notice: Subject to any disclaimer, the term of this patent is extended or adjusted under 35 U.S.C. 154(b) by 458 days.

(21) Appl. No.: 13/003,963

(22) PCT Filed: Jul. 17, 2009

(86) PCT No.: PCT/AU2009/000909
§ 371 (c)(1), (2), (4) Date: Jan. 13, 2011

(87) PCT Pub. No.: WO2010/006371
PCT Pub. Date: Jan. 21, 2010

(65) Prior Publication Data

US 2011/0113838 A1 May 19, 2011

(30) Foreign Application Priority Data

| | | |
|---|---|---|
| Jul. 18, 2008 | (AU) | 2008903698 |
| Feb. 17, 2009 | (AU) | 2009900673 |
| Jun. 19, 2009 | (AU) | 2009902827 |

(51) Int. Cl.
*B60R 25/02* (2013.01)

(52) U.S. Cl.
USPC ..... 70/208; 70/264; 292/336.3; 292/DIG. 30; 292/DIG. 31

(58) Field of Classification Search
USPC ................ 70/208–211, 263, 264; 292/336.3, 292/DIG. 30, DIG. 31
See application file for complete search history.

(56) References Cited

U.S. PATENT DOCUMENTS

| | | | | |
|---|---|---|---|---|
| 1,652,660 | A * | 12/1927 | Devereaux | 70/210 |
| 4,438,964 | A * | 3/1984 | Peters | 292/216 |
| 5,058,258 | A | 10/1991 | Harvey | |
| 5,450,735 | A | 9/1995 | Esaki et al. | |
| 5,493,881 | A | 2/1996 | Harvey | |
| 5,526,660 | A | 6/1996 | Bennett et al. | |
| 5,634,357 | A | 6/1997 | Nutter et al. | |
| 5,941,104 | A * | 8/1999 | Sadler | 70/208 |
| 6,068,308 | A | 5/2000 | Molzer | |

(Continued)

FOREIGN PATENT DOCUMENTS

| | | | |
|---|---|---|---|
| JP | 9125758 | A | 5/1997 |
| JP | 2003307052 | A | 10/2003 |

(Continued)

*Primary Examiner* — Suzanne Barrett
(74) *Attorney, Agent, or Firm* — Craig A. Fieschko, Esq.; DeWitt Ross & Stevens S.C.

(57) ABSTRACT

A locking arrangement comprising: (a) a handle assembly; (b) a primary locking mechanism comprising: (i) a locking bar movable between an extended latching position and a retracted release position, whereby when the locking bar is in the retracted release position the handle assembly is movable between a locked condition and an unlocked condition; and (ii) an actuator means which acts upon the locking bar to move the locking bar between the extended latching position and the retracted release position; (c) a secondary locking mechanism which acts independently upon the locking bar to move the locking bar between the extended latching position and the retracted release position; and (d) at least one biased catch means to releasably retain the locking bar in either the extended latching position or the retracted release position.

20 Claims, 8 Drawing Sheets

(56) References Cited

U.S. PATENT DOCUMENTS

| | | | | |
|---|---|---|---|---|
| 6,209,369 | B1 | 4/2001 | Freck | |
| 6,343,494 | B2 * | 2/2002 | Roos et al. | 70/264 |
| 6,546,765 | B1 | 4/2003 | Linares | |
| 6,651,467 | B1 * | 11/2003 | Weinerman et al. | 70/208 |
| 6,666,053 | B2 * | 12/2003 | Sadler | 70/210 |
| 6,976,375 | B2 * | 12/2005 | Minix | 70/208 |
| 7,013,689 | B2 | 3/2006 | Graham et al. | |
| D562,668 | S | 2/2008 | Stuckey | |
| D585,264 | S | 1/2009 | Stuckey | |
| D585,722 | S | 2/2009 | Stuckey | |
| D585,723 | S | 2/2009 | Stuckey | |
| D590,694 | S | 4/2009 | Stuckey | |
| D593,397 | S | 6/2009 | Stuckey | |
| D607,304 | S | 1/2010 | Stuckey | |
| 7,665,335 | B2 | 2/2010 | Stuckey | |
| 7,748,246 | B1 * | 7/2010 | Paige et al. | 70/208 |
| 7,752,877 | B2 * | 7/2010 | Burns | 70/208 |
| 8,272,240 | B1 * | 9/2012 | Schilens | 70/208 |
| 2005/0257582 | A1 * | 11/2005 | Minix | 70/208 |
| 2008/0105012 | A1 | 5/2008 | Poppell | |

FOREIGN PATENT DOCUMENTS

| | | | |
|---|---|---|---|
| WO | WO 2008040086 | A1 | 4/2008 |
| WO | WO 2009021284 | A1 | 2/2009 |
| WO | WO 2009135266 | A1 | 12/2009 |
| WO | WO 2010006371 | A1 | 1/2010 |

* cited by examiner

LOCKING ARRANGEMENT

FIELD OF THE INVENTION

The present invention relates to a locking arrangement, preferably a locking arrangement for use with a lockable access point such as doors, storage containers, compartments, covers/hatches, transport boxes and bags and the like on vehicles including motor vehicles or cycles. The invention particularly relates to a locking arrangement whereby a primary locking mechanism may be overridden by a secondary locking mechanism.

BACKGROUND OF THE INVENTION

Transport/delivery trucks are often configured for security reasons with enclosed rear van areas, whereby access to the goods located therein is via one or more lockable doors. Similarly, recreational vehicles including mobile homes often contain hollow compartments that act as storage areas, where access to the inside of the compartment is via at least one door or hatch located on the outside of the vehicle's body.

A tradesperson's vehicle in the form of a motor vehicle utility often has one or more toolboxes or storage containers mounted on the utility's tray in which the tradesperson will store his/her tools. Sometimes, the open tray area of the utility can be covered with a solid hatch to protect and secure cargo thereunder. Furthermore, motorcyclists will often have saddlebags affixed to either side of the motorcycle frame for carrying items therein as they travel around.

As the cargo inside each of these storage areas is valuable to its owner, there is a need to prevent unauthorized access to such access points and as a result, the above doors, compartments, boxes, containers, covers and bags are usually lockable.

The invention will be more particularly described herein with respect to one or more door/s on an enclosed van of a truck. However, the invention has general applicability as detailed above.

The presence of such lockable doors brings with it a problem where each door requires its own key for moving its locking mechanism between its locked and unlocked conditions. When the vehicle has a number of lockable doors, the driver has to act on each of the locking mechanisms in order to open its relevant door. One example is where the transport/delivery truck may have as many as eight access doors into its rear enclosed van area, wherein behind each door is a bay holding different cargo relative to each other bay and the driver may need to unlock and open each of the eight doors in turn; until he finds the correct bay. For the driver to walk around the truck, unlocking and then relocking each door, comes at a time cost penalty, which is exacerbated when the doors do not have common locks and each requires a different key. If there are many keys, further time is spent by the driver trying multiple keys in a particular lock, until the correct one is found. In addition, before the driver either leaves his vehicle or drives away, he must ensure that each door is locked, thus wasting even more time.

Further, when returning cargo to a bay in the transport vehicle, the driver may have to put the cargo down on the ground by the side of the vehicle and then find the appropriate key to insert into its relevant lock and then open the door to the desired bay. With the door open, the driver then needs to pick up the returned cargo, put it back into its bay and then close the bay door and relock it. If the driver is returning several different pieces of cargo, which are required to be located in and behind several different doors, more time is lost. More particularly, if any of these events occurs at night, there is an even greater inconvenience to the driver who in addition may need to carry a flashlight to help him find the relevant key.

In many instances, the type of locking arrangement found in the prior art has been of a type that accommodates a low security locking means and thus a simple door lock and latch may suffice. However, as the value of the cargo held in the storage bays increases, so must the standard and security of the door and its locking mechanism. The T-handle has found wide-spread acceptance as a door handle of choice on transport vehicles and the like, since it is mounted in a dish and is therefore essentially flush-fitted to the relevant compartment on the vehicle.

The present invention therefore seeks to provide an improved locking arrangement. More particularly, the present invention provides a locking arrangement, which seeks to minimize or ameliorate the disadvantages of the prior art. For example, most modern vehicles, particularly trucks and motor cars and even motorcycles, have central locking facilities, wherein through activation of a suitable actuator via a remote control device or via the vehicle's own key, the vehicle's lockable doors can be individually in some cases or in most cases, all be locked and unlocked simultaneously. However, it would still be preferable to be able to lock or unlock each locking means either via a key or via the central locking system.

SUMMARY OF THE INVENTION

According to the present invention, there is provided a locking arrangement comprising: a) a handle assembly; b) a primary locking mechanism comprising: (i) a locking bar movable between an extended latching position and a retracted release position whereby, when the locking bar is in the retracted release position the handle assembly is movable between a locked condition and an unlocked condition; and (ii) an actuator means which acts upon the locking bar to move the locking bar between the extended latching position and the retracted release position; c) a secondary locking mechanism which acts independently upon the locking bar to move the locking bar between the extended latching position and the retracted release position; and d) at least one biased catch means to releasably retain the locking bar in either the extended latching position or the retracted release position.

The locking bar preferably includes a first shoulder and a second shoulder against which an override means of the secondary locking mechanism is independently urged to reversibly move the locking bar between the extended latching position and the retracted release position. Preferably further, the locking bar includes a cut-out region into which the override means is receivable.

The locking bar more preferably further includes a first catch means interaction zone and a second catch means interaction zone, wherein, when the locking bar is in the extended latching position, the biased catch means interacts with the first catch means interaction zone to releasably retain the locking bar in the extended latching position, and when the locking bar is in the retracted release position, the biased catch means interacts with the second catch means interaction zone to releasably retain the locking bar in the retracted release position.

In one preferred embodiment of the present invention, the handle assembly comprises a handle, a handle shaft, a slotted disc and a locking cam, wherein the handle, the slotted disc and the locking cam are mountable or fixable to the handle shaft so that rotation of the handle results in concomitant rotation of the slotted disc and locking cam. Preferably, the slotted disc includes one or more regions, preferably a slot/s, with which slots the locking bar engages when in the extended latching position.

Preferably further, the secondary locking mechanism is a keyed lock. Preferably, the secondary locking mechanism includes an override means, which engages with at least one shoulder of the cut-out region, which cut-out region is, in one form of the invention, substantially T-shaped and into which the override means of the secondary locking mechanism is receivable to allow reversible movement of the locking bar between the extended engagement position and the retracted release position. In another preferred form of the invention, the locking bar is adapted to cooperate with the secondary locking means by the inclusion of a first and second shoulder against which the override means can be urged to reversibly move the locking bar between the extended latching position and the retracted release position.

In one embodiment of the invention, the secondary locking mechanism is a keyed lock which includes a biasing means which operates to return the secondary locking means to a reset position after being used to urge the override means against the first and/or second shoulder. Preferably, when in the reset position a key is removed from the secondary locking mechanism.

The preferred handle assembly is in the form of a T-handle assembly and a more preferred version is where the T-handle portion thereof is foldable, so as to minimize its protrusion out of the plane onto which the assembly is mounted.

DESCRIPTION OF THE DRAWINGS

Other features and advantages of one or more preferred embodiments of the present invention will be readily apparent to one of ordinary skill in the art from the following written description with reference to, and used in conjunction with, the accompanying drawings.

DETAILED DESCRIPTION OF THE INVENTION

Figure 1A:
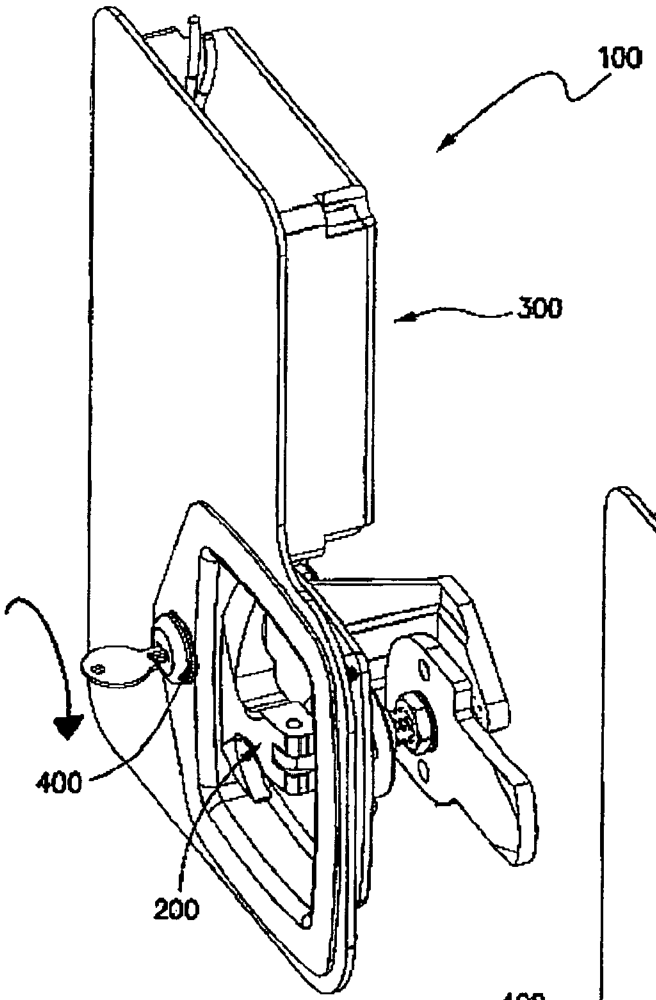
FIG. 1 is a perspective front view of one embodiment of the locking arrangement of the present invention in a locked condition (1*a*) and an unlocked condition (1*b*).
Figure 1B:
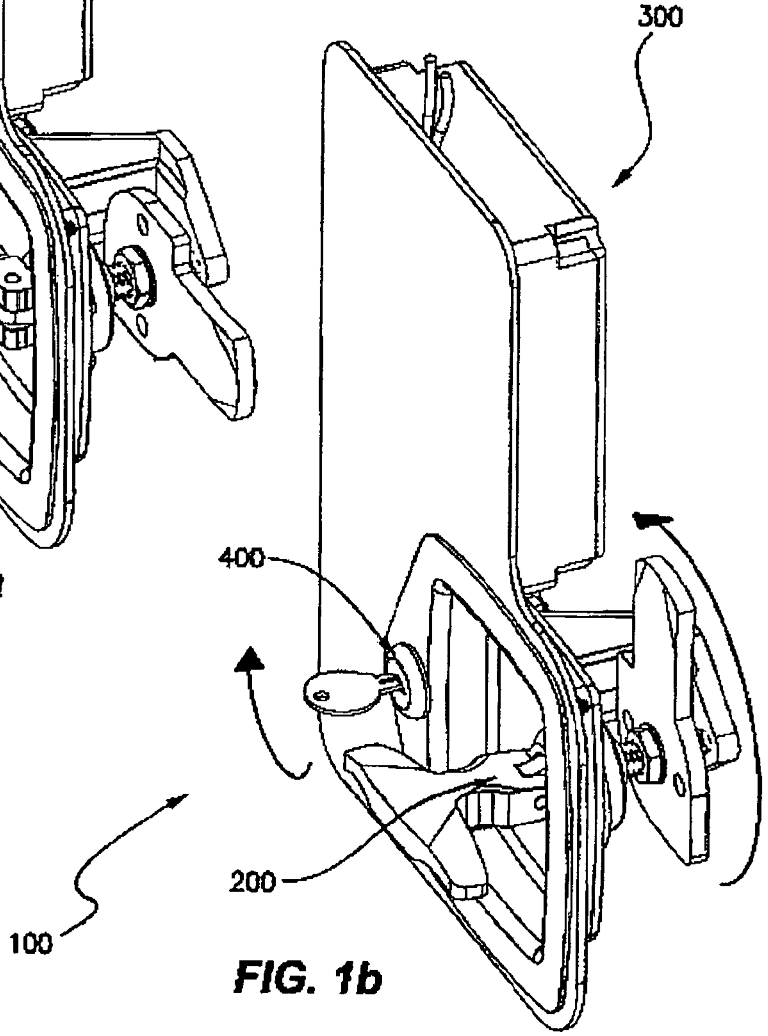
Figure 2:
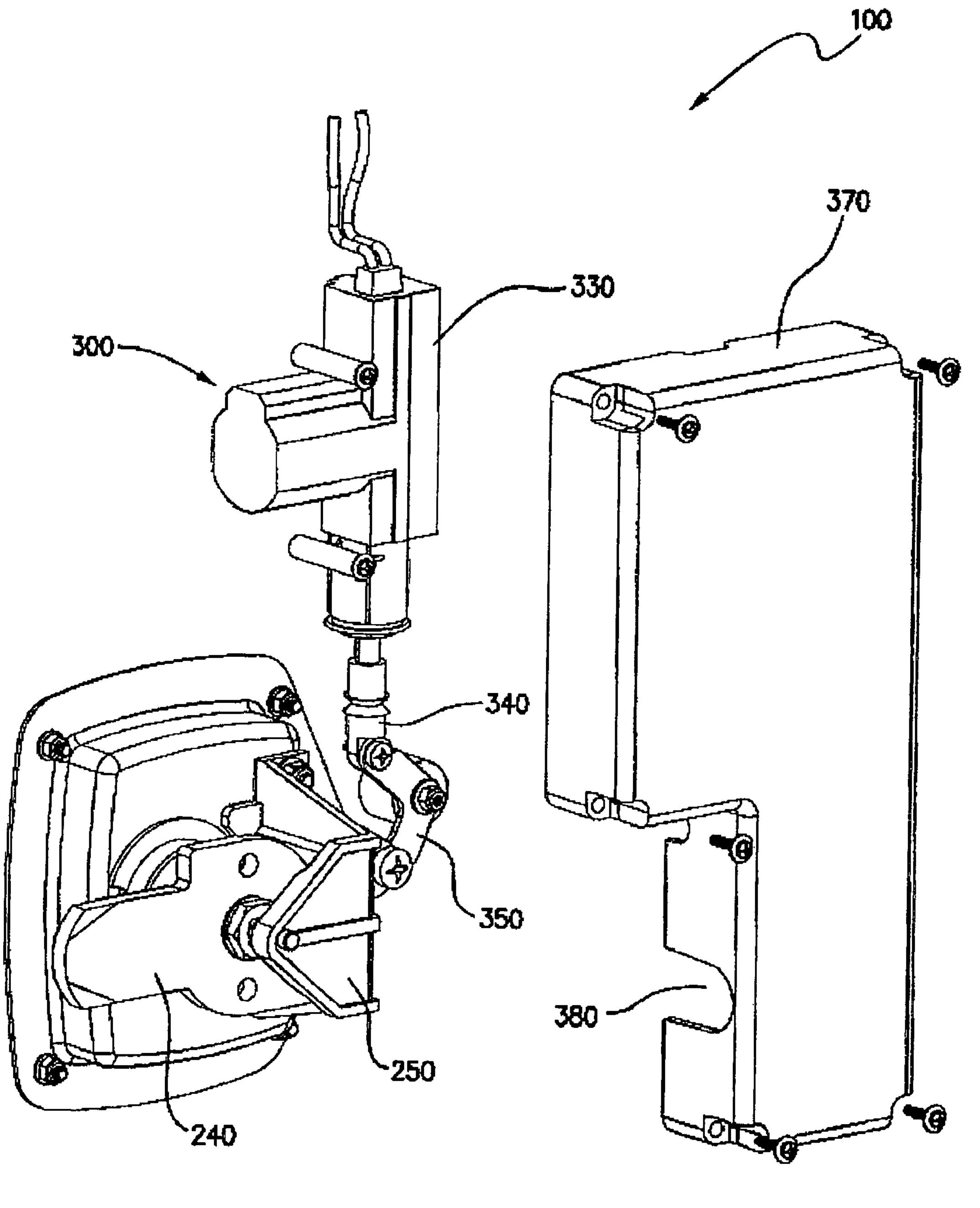
FIG. 2 is a perspective rear view of the embodiment illustrated in FIG. 1, with a cover removed for clarity.
Figure 3:
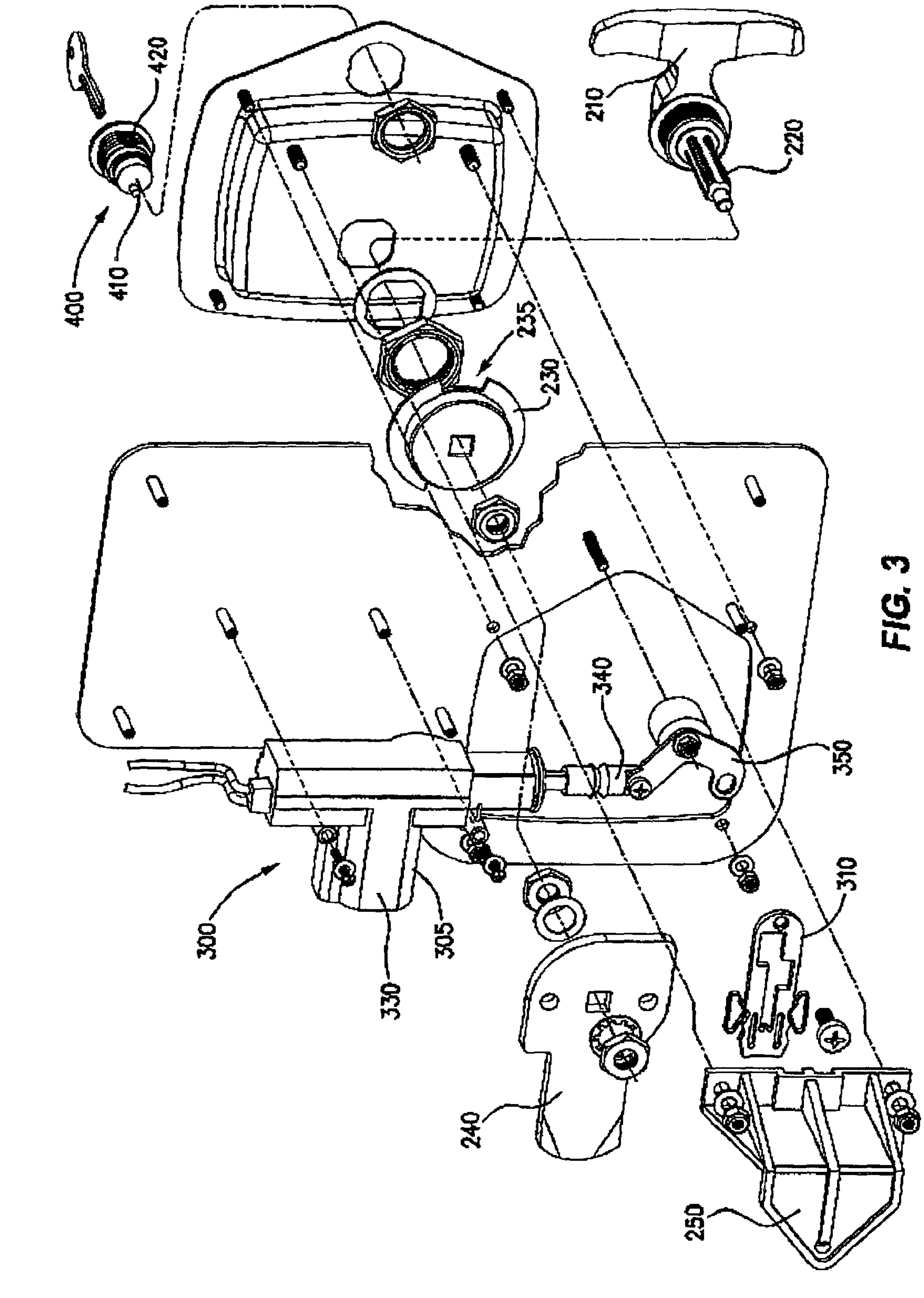
FIG. 3 is an exploded perspective rear view of an embodiment of a locking arrangement according to the present invention, showing the primary and secondary locking mechanisms and locking bar of the present invention.

Referring to all the drawings wherein like reference numerals designate like or corresponding parts throughout the several views, the following description refers to the specific, illustrated embodiments of the present invention and is in no way intended to limit the scope of the present invention to the specific, illustrated embodiments.

The illustrated embodiments of a locking arrangement 100 of the present invention comprise a lockable T-handle assembly 200 having a primary 300 and a secondary 400 locking mechanism. Each of the primary 300 and secondary 400 lacking mechanisms may be used independently to move a locking bar 310 between an extended latching position and a retracted release position.

Figures 4, 5:
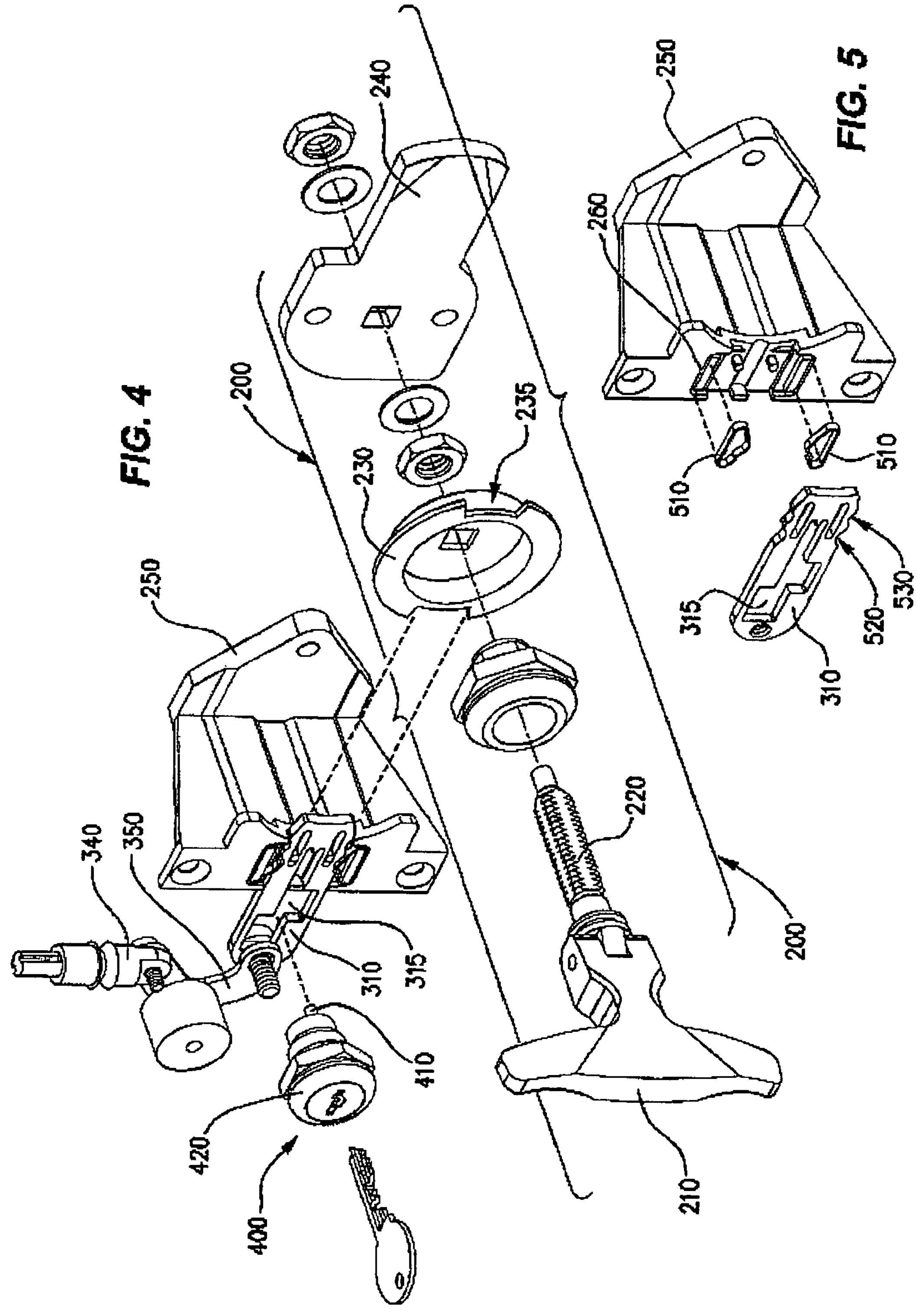
FIG. 4 is an exploded perspective front view of one embodiment of a T-handle assembly, showing the primary and secondary locking mechanisms and locking bar of the present invention.
FIG. 5 shows detail of the support bracket and biased catch means shown in FIG. 4.

Referring to FIG. 4, the T-handle assembly 200 includes a handle 210 attached to a handle shaft 220 such that rotation of the handle 210 results in rotation of the handle shaft 220. Mounted on or fixed to the shaft 220 is a slotted disc 230 and locking cam 240, which are also caused to rotate upon rotation of the handle 210. Assuming the assembly 200 is mounted on a door, the locking cam 240 is intended to engage with a catch means (not shown), such as an opening on the door frame into which the door will fit and into which the catch is received, thereby enabling the door to remain closed. Rotation of the handle 210 results in rotation of the locking cam 240, whereby the locking cam 240 moves out of engagement with the catch means, thereby allowing the door to be opened. The slotted disc 230 includes one or more region's, preferably a slot/s 235, with which the locking bar 310 engages. Therefore, the locking bar 310 is movable relative to the slot 235 between an extended latching position and a retracted release position. When the locking bar 310 is in the extended latching position, i.e. received into the slot 235 in slotted disc 230, the handle 210 cannot be rotated and the locking cam 240 remains engaged with the catch means. In this way, the T-handle assembly 200 is placed in a locked condition via the locking bar.

The refracted release position is where the locking bar 310 is withdrawn from the slot 235 in slotted disc 230, whereby the handle 210 is rotatable and the T-handle assembly 200 is thereby placed in an unlocked condition. It is preferred that the locking bar 310 is movable in a plane substantially perpendicular to the axis of rotation of the handle shaft 220. In order to provide stability and guidance for movement of the locking bar 310, there is provided a support bracket 250. In certain preferred embodiments of the present invention, the support bracket 250 provides support for the free end of handle shaft 220.

Referring in particular to FIG. 5, biased catch means 510 is conveniently housed in a recess 260 within the base of the support bracket 250. However, it is envisaged that the biased catch means 510 is located anywhere in the base of the support bracket 250 provided that biased catch means 510 functions to enable locking bar 310 to be releasably retained in either the extended latched position or the retracted release position. Furthermore, although there are two biased catch means 510 illustrated and described herein, it should be noted that such illustration and description is not intended to limit the scope of the present invention, and it is contemplated that one or more biased catch means 510 may be used. The biased catch means 510 may be in the form of a leaf spring, as illustrated. However, alternative forms of biased catch means 510, for example, a ball-catch arrangement, are also envisaged. In all embodiments, the biased catch means 510 interacts with the locking bar 310 at a first catch means interaction region/s 520, when the locking bar is in an extended latching position and a second catch means interaction zone/s 530, when the locking bar is in a retracted release position.

In alternative embodiments, the biased catch means 510 is locatable on the locking bar 310 and interacts with catch means interaction region/s or zone/s 520 and 530 on the support bracket 250.

The locking arrangement 100 of the present invention includes a primary locking mechanism 300 and a secondary locking mechanism 400 are used independently to move the locking bar 310 into a release position, thereby placing the T-handle assembly 200 in an unlocked condition.

The primary locking mechanism 300 also comprises an actuator 330, wherein the actuator 330 is operable by a vehicle's central locking system.

The actuator 330 as illustrated in the Figures is of the electromagnetic type, as is commonly used in the art of vehicle central locking systems. The actuator's internal operator mean(s) (not shown) is/are accommodated within a housing 305. A solenoid/motor is usually connected to the vehicle central locking system by wiring. However, should the actuator be pneumatically, hydraulically and/or mechanically actuated, suitable linkages other than the solenoid/motor as known in the art can be used to connect and act upon the actuator.

To the working end of the actuator 330, there is provided a coupling nose member 340. The nose member 340 extends from the actuator 330. The nose member can couple with a lever 350, which lever is also connected to the locking bar 310, such that activation of the actuator 330 results in movement of the locking bar 310.

The actuator 330 operates in substantially the same plane as the locking bar 310, but in the illustrated embodiments, its direction of motion is substantially perpendicular to the direction of motion of the locking bar 310. Accordingly, in certain embodiments of the present invention, the actuator 330 is connected to the locking bar 310 via a pivoted lever 350.

In certain embodiments of the present invention, the primary locking mechanism 300 is substantially positioned under a cover 370, wherein the cover 370 includes an opening 380 through which the locking bar 310 protrudes in order to engage with slot 235 in the slotted disc 230.

The secondary locking mechanism 400 is used independently of the primary locking mechanism 300 to move the locking bar 310. For example, when the locking bar 310 is in the extended latching position, the secondary locking mechanism 400 is used to reversibly place the locking bar 310 in the refracted release position.

In order to interact with the locking bar 310, the secondary locking mechanism 400 includes an override means 410. In one form of the invention, the override means 410 is in the form of a pin, as illustrated in FIGS. 3-9. The override means 410 is at least partially receivable in a cut-out region 315 of the locking bar 310, which cut-out region 315 is preferably shaped to permit interaction with the override means 410, whereby the override means 410 urges against a first 316 or second 318 shoulder of the cut-out region 315 to reversibly move the locking bar 310 between the extended latching position and the retracted release position.

Figure 10:
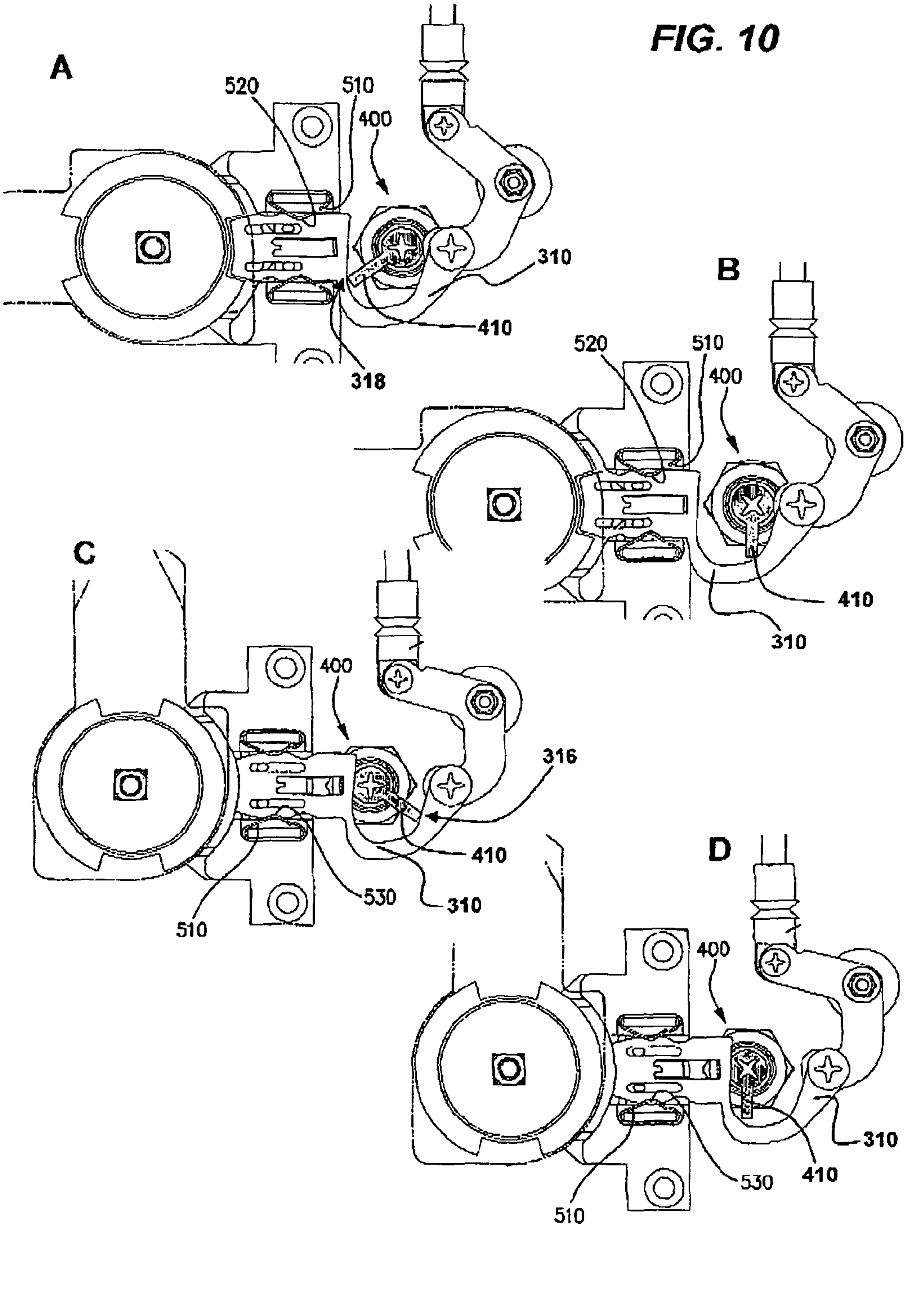
FIG. 10 shows how, in one particular embodiment of the present invention, the secondary locking mechanism is able to act to move the locking bar between an extended latching position (A) and a retracted release position (C). Also shown, is the secondary locking mechanism in a reset position, when the locking bar is in either an extended latching position (B) or a retracted release position (D).

In another form of the invention, the override means 410 is in the form of a cam (FIG. 10). The override means 410 interacts with a region of the locking bar 310. In particular, when the secondary locking mechanism is activated, the override means 410 urges against a first 316 or second 318 shoulder of the locking bar 310 to reversibly move the locking bar 310 between the extended latching position and the retracted release position.

Figure 6:
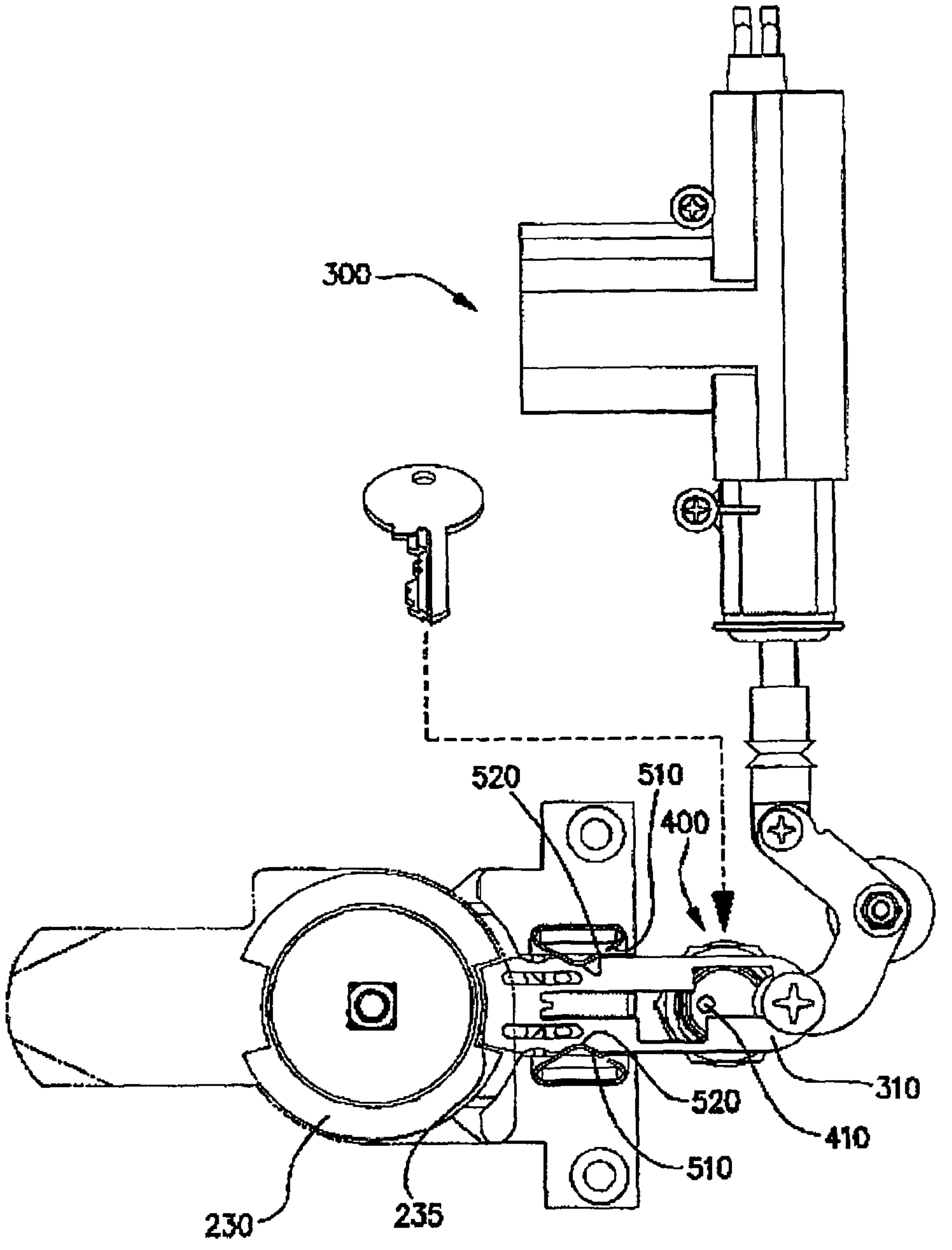
FIGS. 6 to 9 show how, in one particular embodiment of the present invention, the primary and secondary locking mechanisms are able to act independently to move the locking bar between an extended latching position (FIG. 6) and a retracted release position (FIGS. 7 and 9).

As illustrated in FIG. 6, when the locking assembly is in a locked condition, the locking bar 310 is in the extended latching position and engages with slot 235 in the slotted disc 230. With the locking bar in this position, the biased catch means 510 is engaged with the first catch means engagement region/s 520.

In order to place the locking assembly 100 in an unlocked condition, it is necessary to first place the locking bar 310 in the retracted release position, such that the locking bar 310 is disengaged with the slot 235, which thereby permits rotation of the handle assembly 200. Movement of the locking bar 310 is either achieved via use of the primary locking mechanism 300 or the secondary locking mechanism 400.

Figure 7:
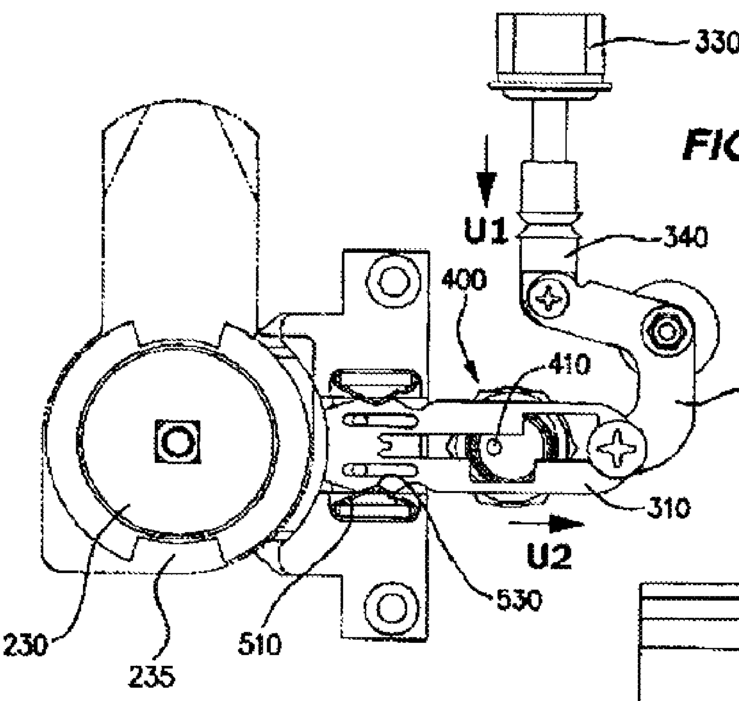

Referring to FIG. 7, the use of the primary locking mechanism 300 is shown. Through activation of the actuator 330 via signals received by the solenoid/motor, the nose member 340 moves in the direction shown by arrow U1, resulting in the overall length of the actuator 330 being increased beyond its "at rest" state and length. Such movement of the nose member 340 results in movement of the locking bar 310 in the direction of the arrow U2, via movement of the pivoted lever 350. With the locking bar 310 in the retracted release position, the biased catch means 510 engages the second catch means interaction zone/s 530.

Accordingly, activation of the actuator 330 results in locking bar 310 being withdrawn from engagement with slot 235 in the slotted disc 230 to place the locking bar 310 in a retracted release position and thereby permit rotation of the handle 210 to place the T-handle assembly 200 in an unlocked condition.

Figure 8:
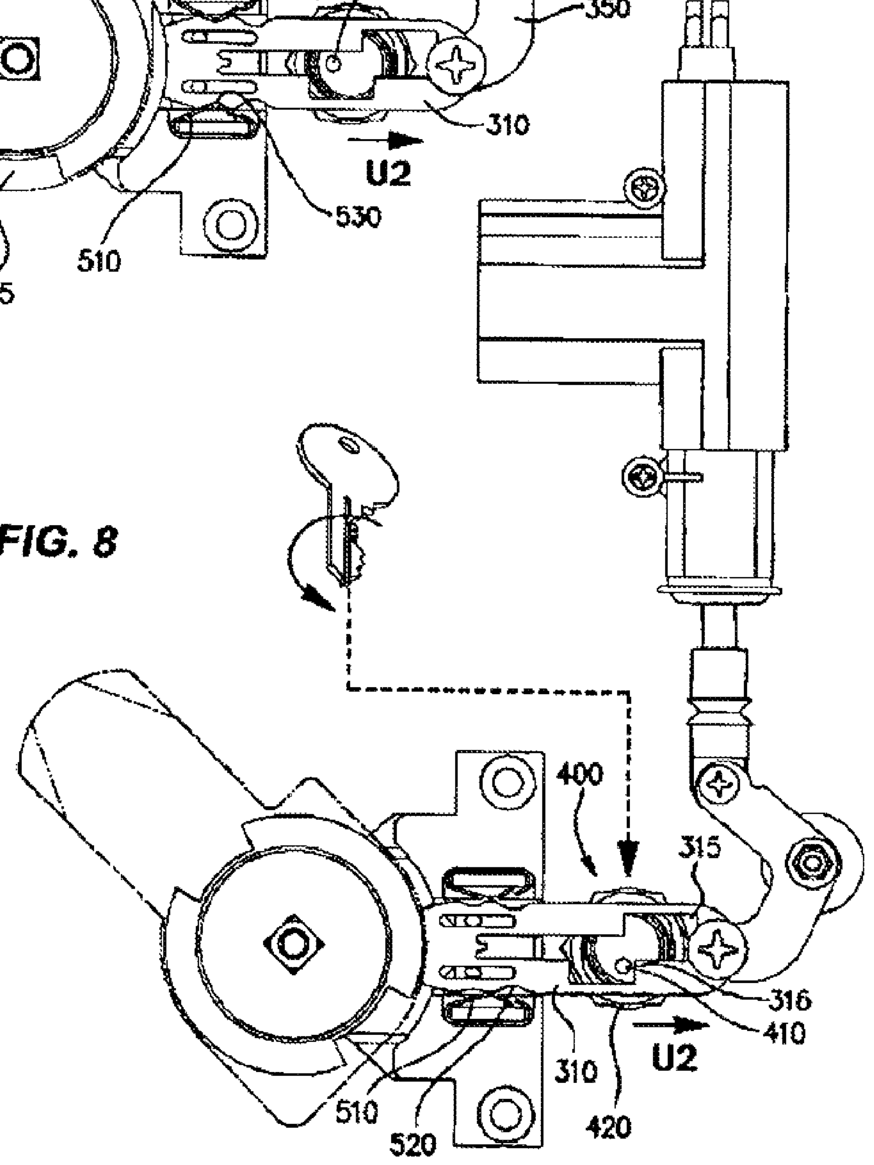

Referring to FIG. 8, the use of the secondary locking mechanism 400 is shown. In the illustrated embodiment, the secondary locking mechanism 400 is in the form of a keyed lock 420 that is capable of rotation in only one direction.

Rotation of the keyed lock 420 brings the override means 410 to bear against a first shoulder 316 of the cut-out region 315 in the locking bar 310. As shown in FIG. 8, further rotation of the keyed lock 420 urges the locking bar 310 towards the retracted release position. In this case, the locking bar 310 moves in the direction indicated by arrow U2 and the biased catch means 510 is no longer engaged with the first catch means engagement region/s 520. Yet further rotation of the keyed lock 420 places the locking bar 310 in the retracted release position (as shown in FIG. 9), thereby permitting rotation of the handle 210 to place the T-handle assembly 200 in an unlocked condition.

In order to secure the locking assembly 100 of the present invention in a locked condition, it is necessary to first place the handle assembly 200 in a locked condition, then place the locking bar 310 in the extended latching position, such that the locking bar 310 is engaged with the slot 235, thereby preventing rotation of the handle assembly 200. Movement of the locking bar 310 is achieved either via use of the primary locking mechanism 300 or the secondary locking mechanism 400.

Figure 9:
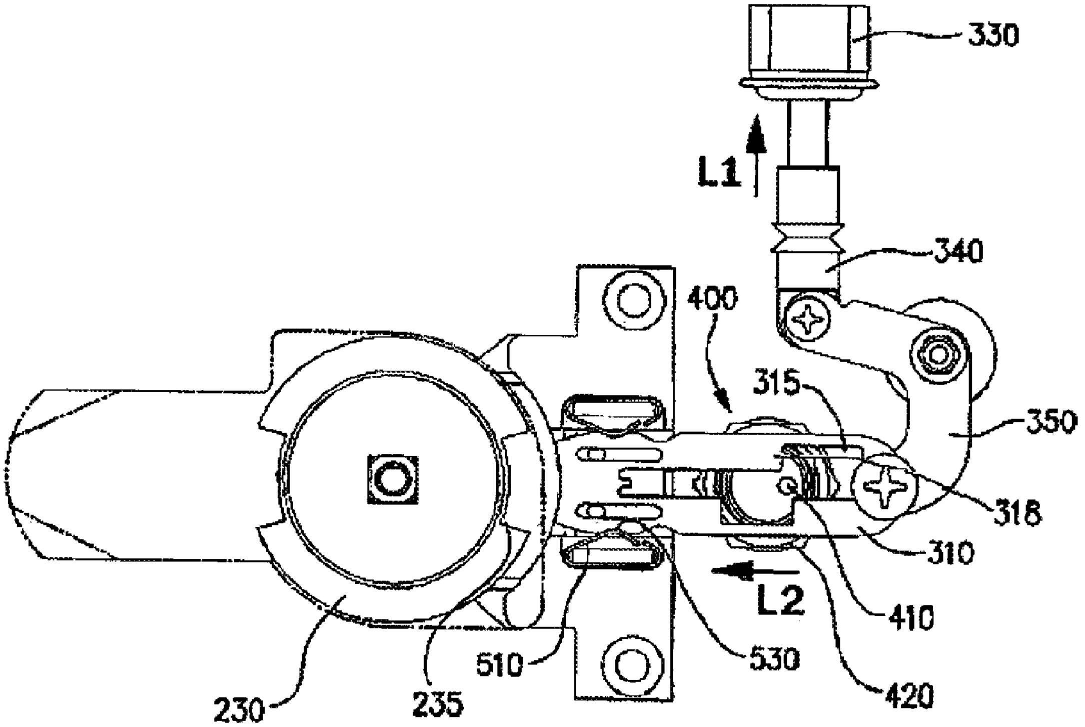

Referring to FIG. 9, upon receiving a signal, the solenoid/motor of the actuator 330 moves the nose member 340 in the direction indicated by arrow L1 whereby the overall length of the actuator 330 returns to its "at rest" state and length. Such movement of the nose member 340 results in movement of the locking bar 310 in the direction of the arrow L2, via movement of the pivoted lever 350. With the locking bar 310 in the extended latching position, the biased catch means 510 engages the first catch means interaction region/s 520.

Accordingly, deactivation of the actuator 330 results in locking bar 310 being urged into engagement with slot 235 in the slotted disc 230 to place the locking bar 310 in an extended latching position and thereby preventing rotation of the handle 210 and retaining the handle assembly 200 in a locked condition.

Similarly, rotation of the keyed lock 420 brings the override means 410 to bear against a second shoulder 318 of the cut-out region 315 in the locking bar 310. Again, the locking bar 310 moves in the direction indicated by arrow L2. Yet further rotation of the keyed lock 420 places the locking bar 310 in the extended latching position, thereby preventing rotation of the handle 210 and retaining the handle assembly 200 in a locked, condition.

Referring to FIG. 10, alternative embodiments of the locking bar 310 and override means 410 are illustrated. Similarly to the above-described preferred embodiments of the present invention, activation of the secondary locking mechanism brings the override means 410 into contact with the first shoulder 316 in order to place the locking bar 310 in the retracted release position (FIG. 10C). In this embodiment, the secondary locking mechanism 400 is in the form of a keyed lock which includes a biasing means that returns the secondary locking mechanism 400 to a reset position (FIG. 10D). In some forms of the present invention, the key is only removable from the keyed lock when the secondary locking mechanism is in the reset position (FIG. 10B and FIG. 10D). In one form, the secondary locking mechanism is rotated to bring the override means 410 into contact with the second shoulder 318 in order to place the locking bar 310 in the extended latching position (FIG. 10A). The biasing means (not shown) on the secondary locking mechanism 400 then returns the secondary locking mechanism 400 to a reset position (FIG. 10B). Use of the primary locking mechanism in this embodiment is as described previously. The locking bar 310 in the embodiment illustrated in FIG. 10 is adapted to allow free movement thereof by the primary locking mechanism 300 without the locking bar 310 contacting the override means 410.

The earlier disadvantages detailed in relation to previous locking mechanisms can be minimized or at least substantially ameliorated by the present invention.

Where the terms "comprise", "comprises", comprised" or "comprising" are used in this specification, they are to be interpreted as specifying the presence of the stated features, integers, steps or components referred to, but not to preclude the presence or addition of one or more other feature, integer, step, component or group thereof.

Those skilled in the art will appreciate that although the invention described herein for simplicity's sake has referred in particular to delivery trucks, it has a general applicability to motor vehicles or lockable access points in general. It is to be understood that the invention includes all variations and modifications of the features identified, including all types of remote control devices, handles and locks referred to or indicated in the specification individually or collectively and any and all combinations of any two or more of said features.

The claims defining the invention are as follows:

1. A locking arrangement comprising:

(a) a handle assembly;

(b) a primary locking mechanism comprising:

(i) a locking bar having a first shoulder and a second shoulder, which bar is movable between an extended locking position and a retracted release position, whereby when the locking bar is in the retracted release position the handle assembly is movable between a latched condition and an unlatched condition; and (ii) an actuator means which acts upon the locking bar to move the locking bar between the extended locking position and the retracted release position;

(c) a secondary locking mechanism having an override means, wherein the override means is independently urged against the first and/or second shoulder of the locking bar to reversibly move the locking bar between the extended locking position and the retracted release position; and (d) at least one biased catch means to releasably retain the locking bar in either the extended locking position or the retracted release position.

2. The locking arrangement according to claim 1, wherein the locking bar further includes a cut-out region into which the override means is receivable.

3. The locking arrangement according to claim 1, wherein the locking bar further includes a first catch means interaction zone and a second catch means interaction zone, wherein when the locking bar is in the extended locking position, the biased catch means interacts with the first catch means interaction zone to releasably retain the locking bar in the extended locking position and when the locking bar is in the retracted release position, the biased catch means interacts with the second catch means interaction zone to releasably retain the locking bar in the retracted release position.

4. The locking arrangement according to claim 1, wherein the handle assembly is a T-handle assembly.

5. The locking arrangement according to claim 1, wherein the handle assembly comprises a handle, a handle shaft, a slotted disc and a latching cam, wherein the handle, the slotted disc and the latching cam are mountable or fixable to the handle shaft, so that rotation of the handle results in the concomitant rotation of the slotted disc and latching cam.

6. The locking arrangement according to claim 5, wherein the slotted disc includes at least one slot with which slot/s the locking bar engages when in the extended locking position.

7. The locking arrangement according to claim 1, wherein the actuator of the primary locking mechanism is operable via a vehicle central locking system.

8. The locking arrangement according to claim 2, wherein the cut-out region is substantially T-shaped and into which the override means of the secondary locking mechanism is receivable to allow reversible movement of the locking bar between the extended locking position and the retracted release position.

9. The locking arrangement according to claim 1, wherein the secondary locking mechanism is a keyed lock.

10. The locking arrangement according to claim 9, wherein the secondary locking includes a biasing means which operates to return the secondary locking means to a reset position after being used to urge the override means against the first and/or second shoulder.

11. The locking arrangement according to claim 9, wherein the key is removable from the secondary locking mechanism when the secondary locking mechanism is in the reset position.

12. A locking arrangement including:

1. a handle assembly;
2. a locking bar movable between:
   a. a retracted release position allowing movement of the handle assembly between a latched condition and an unlatched condition, and
   b. an extended locking position preventing movement of the handle assembly between the latched condition and the unlatched condition;
3. a catch biased against the locking bar and selectively engaging the locking bar in the position into which the locking bar is moved;
4. an actuator configured to move the locking bar between the retracted release position and the extended locking position upon receiving an actuator input delivered from a location distant from the handle assembly;

5. an override member drivable by a key to bear against the locking bar to reversibly urge the locking bar between the retracted release position and the extended locking position.

13. The locking arrangement of claim 12 wherein the handle assembly includes:
1. a handle,
2. a handle shaft extending from the handle,
3. a disc on the handle shaft, the disc bearing a slot alignable with the locking bar; and'
d. a latching cam on the handle shaft.

14. The locking arrangement of claim 12 wherein the actuator moves the locking bar between the retracted release position and the extended locking position upon receiving an electromagnetic actuator input.

15. The locking arrangement of claim 12 wherein the actuator receives the actuator input from a vehicle central locking system.

16. The locking arrangement of claim 12 wherein the actuator includes a solenoid.

17. The locking arrangement of claim 12 wherein the override member extends within a cut-out region defined within the locking bar, the cut-out region including first and second shoulders defined on opposing sides of an elongated passage.

18. The locking arrangement of claim 12 wherein the catch is elastically biased to selectively engage one of two or more indents adjacently situated along the locking bar.

19. The locking arrangement of claim 12 wherein:
1. the locking bar is translatable between the retracted release position and the extended locking position,
2. when in the extended locking position, the locking bar rests within a slot in the handle assembly, and
3. the locking bar includes at least a pair of indents defined therein, wherein the catch engages:
a. a first one of the indents when the locking bar is in the extended locking position, and
b. a second one of the indents when the locking bar is in the retracted release position.

20. A locking arrangement including:
1. a handle assembly including a rotatable handle;
2. a locking bar translatable between:
a. an extended locking position preventing rotation of the handle, and
b. a retracted release position allowing rotation of the handle,
the locking bar including at least two indents defined therein;
3. a catch biased against the locking bar and selectively engaging:
a. a first one of the indents when the locking bar is in the extended locking position, and
b. a second one of the indents when the locking bar is in the retracted release position;
4. an actuator configured to move the locking bar between the retracted release position and the extended locking position upon receiving an electromagnetic actuator input;
5. an override member drivable by a key to move the locking bar between the retracted release position and the extended locking position.

* * * * *